(12) United States Patent
Tucker et al.

(10) Patent No.: US 7,850,865 B1
(45) Date of Patent: Dec. 14, 2010

(54) HIGHLY CONCENTRATED FOAM FORMULATION FOR BLAST MITIGATION

(75) Inventors: Mark D. Tucker, Albuquerque, NM (US); Huizhen Gao, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 304 days.

(21) Appl. No.: 12/127,252

(22) Filed: May 27, 2008

(51) Int. Cl.
*A64D 1/00* (2006.01)
*B01F 3/04* (2006.01)
(52) U.S. Cl. .............................. 252/3; 588/901; 516/10; 516/14; 516/17
(58) Field of Classification Search ................. 252/478; 442/134, 136; 428/920, 921; 86/50; 516/10, 516/14, 17; 588/901
See application file for complete search history.

(56) References Cited

U.S. PATENT DOCUMENTS

| | | | | |
|---|---|---|---|---|
| 6,553,887 | B1* | 4/2003 | Bureaux et al. | 86/50 |
| 2007/0077835 | A1* | 4/2007 | Leivesley | 442/134 |

* cited by examiner

*Primary Examiner*—Ling-Siu Choi
*Assistant Examiner*—Monique Peets
(74) *Attorney, Agent, or Firm*—Robert D. Watson

(57) ABSTRACT

A highly concentrated foam formulation for blast suppression and dispersion mitigation for use in responding to a terrorism incident involving a radiological dispersion device. The foam formulation is more concentrated and more stable than the current blast suppression foam (AFC-380), which reduces the logistics burden on the user.

14 Claims, 1 Drawing Sheet

HIGHLY CONCENTRATED FOAM FORMULATION FOR BLAST MITIGATION

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The current emergency response to a radiological dispersal device (RDD), for which a blast suppression and dispersion mitigation foam is needed, requires transport of almost fifty, 5-gallon drums of foam concentrate (AFC-380), which was developed previously at Sandia National Laboratories (along with support and deployment equipment). Emergency responders have a new objective of substantially reducing the weight required to deploy a RDD blast suppression and dispersion mitigation foam. What is needed are improved formulations that result in a more concentrated and more effective version than the current blast mitigation foam concentrate AFC-380. Such formulations would offer the potential to substantially reduce the weight of the blast suppression and dispersion mitigation foam to meet the objective of the emergency responders.

Foams are generally prepared and deployed as concentrates. For example, AFC-380 is prepared in the form of a 6% concentrate. To deploy 100 gallons of finished foam, 6 gallons of AFC-380 concentrate is added to 94 gallons of make-up water (obtained from a local source such as a fire hydrant, lake, or stream). Likewise, to make 100 gallons of finished foam using a 3% concentrate, 3 gallons of foam concentrate would be added to 97 gallons of make-up water. The basic strategy employed in this invention to reduce the weight of the blast suppression and dispersion mitigation foam by developing a more highly concentrated foam concentrate (i.e., more concentrated than the 6% AFC-380 concentrate).

As will be shown in the experimental results, we have developed a 2% foam concentrate that has a greater expansion ratio and higher foam stability than AFC-380. This new formulation would only require 2 gallons of foam concentrate to make 100 gallons of finished foam (as compared to 6 gallons of AFC-380 foam concentrate), which reduces the weight burden on the user by approximately 67%.

Against this background, the present invention was developed.

SUMMARY OF THE INVENTION

A highly concentrated foam formulation for blast suppression and dispersion mitigation for use in responding to a terrorism incident involving a radiological dispersion device. The foam formulation is more concentrated and more stable than the current blast suppression foam (AFC-380), which reduces the logistics burden on the user.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Figure 1:
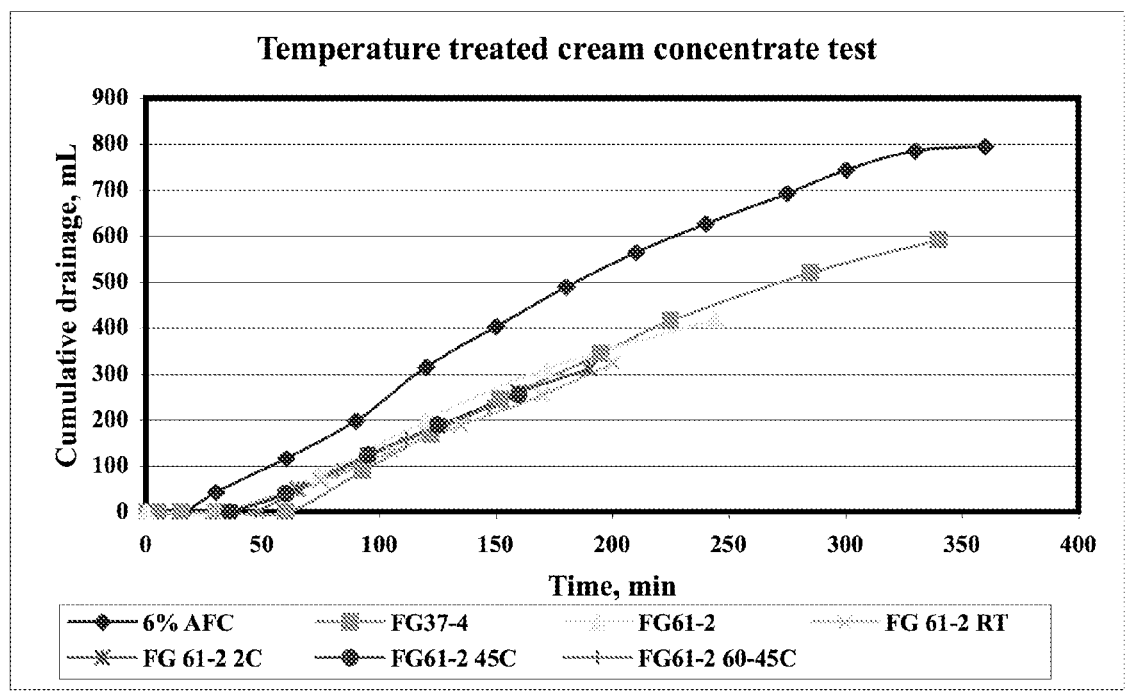
FIG. 1 shows a Comparison of Foam Drainage from Temperature Treated Cream Concentrates.

Foams are employed for various uses. For blast suppression and dispersion mitigation, foam is deployed over and covers the explosive/dispersal device. If the destructive device is initiated, the foam both contains the dispersed particles and can dramatically reduce the blast overpressures thereby reducing collateral damage caused by the blast. There are two important physical properties for blast suppression and dispersion mitigation foam. First, it must have a relatively large expansion ratio (i.e., the volume of foam generated divided its original liquid volume). Ideally, the expansion ratio of a blast suppression foam should be between 60:1 and 150:1. The second important physical property is the foam's stability. Foam stability is measured by its drainage rate (i.e., the volume of liquid that drains out of an expanded foam over time). A blast suppression foam should be highly stable (i.e., have a low drainage rate) with a half drainage time of at least one hour. Foam expansion is dependent on the surface tension within the foam formulation while foam stability has been shown to increase with bulk viscosity of the foaming solution and the surface viscosity of the adsorbed surfactant layer at the air/water interface, which is increased due to close packing of surfactant molecules. Therefore, these properties can be modified in a foam formulation by careful selection of ingredients such as the surfactant and other additives, such as polymers, stabilizers and organic solvents. The effect of some of these ingredients on the important foam properties are discussed in greater detail below.

Mixed Surfactant and Foam Stabilizer

Mixed surfactants affect foam stability due to their ability to change the 2-D arrangement on the air/water surface. Different chain lengths of surfactants can pack more tightly than only one surfactant. Anionic surfactants such as sodium dodecanyl sulfate (SDS) mixed with certain additives (e.g., a nonionic surfactant as n-dodecanol) can increase the relaxation time of bulk phase micelles, and consequently, enhance the foam stability. In the improved blast foam formulation that is the subject of this invention, SDS and BioTerge AS40 surfactants are mixed in the molar ratio of 1:1 with a small amount of 1-dodecanol as the additive, which results in a great increase in foam expansion ratio and stability.

Water Soluble Polymer

Polymers are used as additives in foam formulations to increase the bulk viscosity. At a given surfactant concentration, the bulk viscosity of the foam forming solution depends on the polymer concentration, the degree of hydrolysis, solution ionic strength, pH, temperature, and other additives. In the modified blast foam formulation, we use the polysaccharides Xanthan gum and hydroxyl ethylcellulose (HEC). In a concentrated formulation, HEC particularly plays an important role as the thickening agent due its high swelling power. The synergy of these two polysaccharides, along with the two surfactants (SDS and BioTerge AS40), stabilizes the concentrate to prevent separation of the ingredients at extreme storage temperatures. In the finished foam solution, the combination of the polymers and surfactants gives the foam a larger expansion ratio and higher stability than AFC-380.

After a series of experiments, we developed a simple concentrated cream formulation and a simple preparation method. This can be deployed as a 2% concentrate.

TABLE 1

Blast Foam cream concentrate composition FG61-2

| Ingredient | weight percentage, wt % |
|---|---|
| 2-hydroxyethylcellulose (HEC) | 3.0 |
| Xantham gum (XG) | 4.4 |
| Sodium dodecyl sulfate (SDS) | 13.7 |
| n-dodecanol (DOH) | 2.4 |
| Diethylene glycol monobutyl ether (DEGMBE) | 15.7 |
| isobutanol (iBOH) | 10.0 |
| BioTerge AS-40 (BT) | 50.8 |

A description of the function of the various ingredients of the blast foam cream concentrate composition, and suitable alternative substitutes, follows:

2-hydroxyethylcellulose (HEC)—a nonionic polymer which turns the mixture into a flowable cream. Suitable alternatives include: Carboxymethyl Cellulose (CMC), Polyanionic Cellulose (PAC), hydroxymethylcellulose, hydroxypropylcellulose, and hydroxypropylmethyl cellulose (HPMC)

Xantham gum (XG)—an anionic polymer viscosity enhancer/thickener. Suitable alternatives include: Guar gum, agar, carrageenan, sodium alginate, caseinate, and other natural and synthetic polysaccharide polymers.

Sodium dodecyl sulfate (SDS)—a first anionic surfactant foaming agent. Suitable alternatives include: carboxylic acid salts, sulfonic acid salts, sulfuric acid ester salts, and phosphoric acid esters.

n-dodecanol (DOH)—a foam stabilizer. Suitable alternatives include: n-tetradecanol, n-tridecanol, and n-hexadecanol.

Diethylene glycol monobutyl ether (DEGMBE)—a solvent that solubilizes the dodecanol. Suitable alternatives include: tripropylene glycol methyl ether, propylene glycol, hexylene glycol, ethylene glycol, or other ether solvents.

isobutanol (iBOH)—an alcohol that solubilizes the dodecanol. Suitable alternatives include (tert-butanol, propanol, isopropyl alcohol, or other low molecular weight alcohols.

BioTerge AS-40 (BT)—a second anionic surfactant foaming agent. BioTerge AS-40 is an alpha-olefin sulfonate; the hydrophobic chain is primarily in the C14-C16 range. Suitable alternatives include: carboxylic acid salts, sulfonic acid salts, sulfuric acid ester salts, and phosphoric acid esters.

The highly concentrated blast foam concentrate composition can have the following ranges of concentrations for the various ingredients described above:

Ranges of Compositions of Blast Foam Concentrate
  1-5 wt % nonionic polymer;
  1-8 wt % anionic polymer viscosity enhancer/thickener;
  5-18 wt % first anionic surfactant foaming agent;
  1-4 wt % foam stabilizer;
  5-25 wt % solvent;
  5-15 wt % alcohol; and
  25-75 wt % second anionic surfactant foaming agent.

Preparation of the cream concentrate: Add the solvents and stabilizer (DOH, iBOH, and DEGMBE) to a mixing vessel. Add the dry ingredients (HEC, XG, and SDS) into the solvent mixture. Mix and disperse the dry ingredients completely through the solvent mixture. Add BT in a small stream while continuously stirring. Keep mixing, until a homogenous cream is formed.

Foam Generation: The expansion ratio and stability of the new blast suppression and dispersion mitigation formulation were compared to AFC-380. For each test, an aqueous blast foam solution was prepared by adding 2% (by volume) of the blast foam cream concentrate to 98% (by volume) of make-up water. The experimental setup for the expansion ratio and stability test includes a compressed air cylinder and a one-liter stainless steel cylinder for holding the made-up aqueous foam solution to be tested. The solution (1 L) within the steel cylinder was forced out of the cylinder by compressed air through an aspirating foam nozzle (Chemguard, Inc.) into a 30-gallon container with a conic bottom. The operating pressure in the steel chamber was 100 psi. Foam expansion was determined by markings on the 30-gallon container at every 5 gallon interval (i.e., the deployed volume of the foam $[V_f]$ divided by testing volume $[V_s]$ was recorded as the expansion ratio [ER]). Foam drainage flowed through a valve at the base of the conical bottom in the 30-gallon container into a graduated beaker. By monitoring the foam drainage over time, foam stability was determined. The time when drainage started was recorded as lag time (lag t, minute) and the time for draining one tenth of the foam solution was recorded as $t_{1/10}$, minute. The surface tension (S) and bulk viscosity of the bulk solution were also measured for each successful test solution.

The cream concentrate was also tested at the extreme temperatures of 2° C. and 45 to 60° C. for 5 days to determine if it was stable. The experimental results are shown in Table 2 and FIG. 1. The sample ID shows the notebook (FG)-page number (-61) and formula number developed on the day (-2). It also shows the temperature at which the formulation was stored (Room Temperature [RT], 2° C., 45° C., or 45-60° C.). For each test using the FG61-2 cream concentrate, 2% (by volume) of the concentrate was added to 98% (by volume) make-up water. For AFC-380 and FG37-4, a higher concentration, 6% (by volume), of the concentrate was added to 94% (by volume) make-up water. De-ionized water was used as the make-up water for each test.

TABLE 2

Comparison of the foaming properties among several concentrates

| Sample ID | Viscosity, mm$^2$/s | S, dynes/cm | ER | lag t, min | t1/10, min |
|---|---|---|---|---|---|
| FG61-2 | 6.73 | 27.3 | 132 | 35 | 80 |
| FG61-2 RT | 8.02 | 28.0 | 140 | 28.5 | 85 |
| FG61-2 2 C | 7.74 | 28.2 | 140 | 36 | 80 |
| FG61-2 45 C | 6.84 | 28.0 | 140 | 36.5 | 90 |
| FG61-2 60-45 C | 6.99 | 28.0 | 150-160 | 47 | 90 |
| FG37-4 | 6.04 | 27.8 | 114 | 59 | 95 |
| 6% AFC | 4.69 | 29.1 | 66 | 16 | 55 |

These results clearly show that the cream concentrate formulation (FG61-2) has a greater expansion ratio (ER) and higher stability, as shown in the measured lag times, t, and $t_{1/10}$, than AFC-380. The new formulations have foam expansion ratios greater than 60, a drainage lag time greater than 10 minutes, and a time for draining one tenth of the foam solution ($t_{1/10}$) greater than 15 minutes. In particular, the new formulations have foam expansion ratios greater than or equal to 140, drainage lag times greater than 30 minutes, and a time for draining one tenth of the foam solution ($t_{1/10}$) greater than or equal to 80 minutes.

The blast suppression and dispersal mitigation foam developed in this invention could potentially be used by civilian first responders and by the US and foreign militaries. It could potentially replace AFC-380 for this application due to its lower logistics burden.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A highly concentrated blast foam concentrate composition, comprising:
    1-5 wt % nonionic polymer;
    1-8 wt % anionic polymer viscosity enhancer/thickener;
    5-18 wt % first anionic surfactant foaming agent;
    1-4 wt % foam stabilizer;
    5-25 wt % solvent;
    5-15 wt % alcohol; and
    25-75 wt % second anionic surfactant foaming agent;
   wherein the nonionic polymer is selected from the group consisting of 2-hydroxyethylcellulose, carboxymethyl cellulose, polyanionic cellulose, hydroxymethylcellulose, hydroxypropylcellulose, and hydroxypropylmethyl cellulose.

2. The concentrate composition of claim 1, wherein the anionic polymer viscosity enhancer/thickener is selected from the group consisting of Xantham gum, Guar gum, agar, carrageenan, sodium alginate, caseinate, and natural or synthetic polysaccharide polymers.

3. A highly concentrated blast foam concentrate composition, comprising:
    1-5 wt % nonionic polymer;
    1-8 wt % anionic polymer viscosity enhancer/thickener;
    5-18 wt % first anionic surfactant foaming agent;
    1-4 wt % foam stabilizer;
    5-25 wt % solvent;
    5-15 wt % alcohol; and
    25-75 wt % second anionic surfactant foaming agent;
   wherein the first anionic surfactant foaming agent is selected from the group consisting of sodium dodecyl sulfate, carboxylic acid salts, sulfonic acid salts, sulfuric acid ester salts, and phosphoric acid esters.

4. A highly concentrated blast foam concentrate composition, comprising:
    1-5 wt % nonionic polymer;
    1-8 wt % anionic polymer viscosity enhancer/thickener;
    5-18 wt % first anionic surfactant foaming agent;
    1-4 wt % foam stabilizer;
    5-25 wt % solvent;
    5-15 wt % alcohol; and
    25-75 wt % second anionic surfactant foaming agent;
   wherein the foam stabilizer is selected from the group consisting of n-dodecanol, n-tetradecanol, n-tridecanol, and n-hexadecanol.

5. A highly concentrated blast foam concentrate composition, comprising:
    1-5 wt % nonionic polymer;
    1-8 wt % anionic polymer viscosity enhancer/thickener;
    5-18 wt % first anionic surfactant foaming agent;
    1-4 wt % foam stabilizer;
    5-25 wt % solvent;
    5-15 wt % alcohol; and
    25-75 wt % second anionic surfactant foaming agent;
   wherein the solvent is selected from the group consisting of diethylene glycol monobutyl ether, tripropylene glycol methyl ether, propylene glycol, hexylene glycol, ethylene glycol, and ether solvents.

6. A highly concentrated blast foam concentrate composition, comprising:
    1-5 wt % nonionic polymer;
    1-8 wt % anionic polymer viscosity enhancer/thickener;
    5-18 wt % first anionic surfactant foaming agent;
    1-4 wt % foam stabilizer;
    5-25 wt % solvent;
    5-15 wt % alcohol; and
    25-75 wt % second anionic surfactant foaming agent;
   wherein the alcohol is selected from the group consisting of isobutanol (iBOH), tert-butanol, propanol, isopropyl alcohol, and low molecular weight alcohols.

7. A highly concentrated blast foam concentrate composition, comprising:
    1-5 wt % nonionic polymer;
    1-8 wt % anionic polymer viscosity enhancer/thickener;
    5-18 wt % first anionic surfactant foaming agent;
    1-4 wt % foam stabilizer;
    5-25 wt % solvent;
    5-15 wt % alcohol; and
    25-75 wt % second anionic surfactant foaming agent;
   wherein the second anionic surfactant foaming agent is selected from the group consisting of BioTerge AS-40, alpha-olefin sulfonate anionic surfactant, carboxylic acid salts, sulfonic acid salts, sulfuric acid ester salts, and phosphoric acid esters.

8. A highly concentrated blast foam concentrate composition, comprising:
    3.0 wt % 2-hydroxyethylcellulose;
    4.4 wt % xantham gum;
    13.7 wt % sodium dodecyl sulfate;
    2.4 wt % n-dodecanol;
    15.7 wt % diethylene glycol monobutyl ether;
    10.0 wt % isobutanol; and
    50.8 wt % alpha-olefin sulfonate anionic surfactant.

9. A highly concentrated blast foam concentrate composition, consisting of:
    3.0 wt % 2-hydroxyethylcellulose;
    4.4 wt % xantham gum;
    13.7 wt % sodium dodecyl sulfate;
    2.4 wt % n-dodecanol;
    15.7 wt % diethylene glycol monobutyl ether;
    10.0 wt % isobutanol; and
    50.8 wt % alpha-olefin sulfonate anionic surfactant.

10. The concentrate composition of claim 3, wherein the anionic polymer viscosity enhancer/thickener is selected from the group consisting of Xantham gum, Guar gum, agar, carrageenan, sodium alginate, caseinate, and natural or synthetic polysaccharide polymers.

11. The concentrate composition of claim 4, wherein the anionic polymer viscosity enhancer/thickener is selected from the group consisting of Xantham gum, Guar gum, agar, carrageenan, sodium alginate, caseinate, and natural or synthetic polysaccharide polymers.

12. The concentrate composition of claim 5, wherein the anionic polymer viscosity enhancer/thickener is selected from the group consisting of Xantham gum, Guar gum, agar, carrageenan, sodium alginate, caseinate, and natural or synthetic polysaccharide polymers.

13. The concentrate composition of claim 6, wherein the anionic polymer viscosity enhancer/thickener is selected from the group consisting of Xantham gum, Guar gum, agar, carrageenan, sodium alginate, caseinate, and natural or synthetic polysaccharide polymers.

14. The concentrate composition of claim 7, wherein the anionic polymer viscosity enhancer/thickener is selected from the group consisting of Xantham gum, Guar gum, agar, carrageenan, sodium alginate, caseinate, and natural or synthetic polysaccharide polymers.

* * * * *